(12) United States Patent
Suga (10) Patent No.: US 11,396,910 B2
(45) Date of Patent: Jul. 26, 2022

(54) SLIDING MEMBER AND SLIDING BEARING (71) Applicant: TAIHO KOGYO Co., Ltd., Toyota (JP)

(72) Inventor: Shigeyuki Suga, Toyota (JP)

(73) Assignee: TAIHO KOGYO CO., LTD., Toyota (JP)

( * ) Notice: Subject to any disclaimer, the term of this patent is extended or adjusted under 35 U.S.C. 154(b) by 134 days.

(21) Appl. No.: 16/318,907

(22) PCT Filed: Jun. 29, 2018

(86) PCT No.: PCT/JP2018/024804
§ 371 (c)(1),
(2) Date: Jan. 18, 2019

(87) PCT Pub. No.: WO2019/017182
PCT Pub. Date: Jan. 24, 2019

(65) Prior Publication Data
US 2019/0203769 A1 Jul. 4, 2019

(30) Foreign Application Priority Data

Jul. 21, 2017 (JP) .............................. JP2017-141581
Aug. 4, 2017 (JP) .............................. JP2017-151239

(51) Int. Cl.
*F16C 33/12* (2006.01)
*C22C 12/00* (2006.01)
*C22C 13/00* (2006.01)
*F16C 33/14* (2006.01)

(52) U.S. Cl.
CPC .............. *F16C 33/12* (2013.01); *C22C 12/00* (2013.01); *C22C 13/00* (2013.01); *F16C 33/14* (2013.01); *F16C 2204/12* (2013.01); *F16C 2204/18* (2013.01)

(58) Field of Classification Search
CPC .... F16C 33/12; F16C 33/124; F16C 2204/36; C22C 12/00
See application file for complete search history.

(56) References Cited

U.S. PATENT DOCUMENTS

| | | | | |
|---|---|---|---|---|
| 3,664,865 A | * | 5/1972 | Lanza | C04B 41/009 428/408 |
| 5,817,397 A | * | 10/1998 | Kamiya | B32B 15/01 428/141 |
| 5,911,513 A | | 6/1999 | Tsuji et al. | |
| 6,357,919 B1 | | 3/2002 | Kawachi et al. | |
| 2004/0241489 A1 | * | 12/2004 | Kawachi | F16C 33/121 428/642 |
| 2010/0296965 A1 | | 11/2010 | Ijichi et al. | |
| 2011/0034354 A1 | * | 2/2011 | Zidar | C22C 5/08 508/103 |
| 2011/0124535 A1 | * | 5/2011 | Wada | C25D 11/26 508/103 |
| 2011/0142381 A1 | | 6/2011 | Zidar | |
| 2012/0064358 A1 | | 3/2012 | Takayanagi et al. | |
| 2012/0277131 A1 | | 11/2012 | Asakura et al. | |

FOREIGN PATENT DOCUMENTS

| | | | | |
|---|---|---|---|---|
| CN | 101680482 A | 3/2010 | | |
| CN | 101952080 A | 1/2011 | | |
| CN | 102094900 A | 6/2011 | | |
| CN | 102918182 A | 2/2013 | | |
| GB | 2379449 A | * | 3/2003 | ............... C25D 7/10 |
| GB | 2492673 A | * | 1/2013 | ............... F16C 33/12 |
| GB | 2533915 A | * | 7/2016 | ............... C25D 7/10 |
| GB | 2534120 A | * | 7/2016 | ............... C25D 3/56 |
| JP | 05-52221 A | 3/1993 | | |
| JP | 05-117790 A | 5/1993 | | |
| JP | 11-50296 A | 2/1999 | | |
| JP | 2002-310158 A | 10/2002 | | |
| JP | 2004-308883 A | 11/2004 | | |
| JP | 2004-353042 A | 12/2004 | | |
| JP | 2006-105265 A | 4/2006 | | |
| JP | 2007-501919 A | 2/2007 | | |
| JP | 2011-137227 A | 7/2011 | | |
| JP | 2011-163382 A | 8/2011 | | |
| JP | 2012-062941 A | 3/2012 | | |
| JP | 2012062942 A | 3/2013 | | |
| JP | 2015-096750 A | 5/2015 | | |
| JP | 2015-178655 A | 10/2015 | | |
| JP | 2016-027281 A | 2/2016 | | |
| WO | 96/27088 A1 | 9/1996 | | |

(Continued)

OTHER PUBLICATIONS

Period Table; "Hardness of Chemical Elements"; <URL: www.periodic-table.org/hardness-of-chemical-elements-brinell-mohs-vickers/ >; Retrieved Nov. 2, 2020 (Year: 2020).*
International Search Report of PCT/JP2018/024804 dated Oct. 2, 2018.
Written Opinion of the International Searching Authority of PCT/JP2018/024804 dated Oct. 2, 2018.
Communication dated Nov. 4, 2019 from the State Intellecutal Property Office of People's Republic of China in application No. 201880002598.4.
Office Action dated Dec. 3, 2019 in application No. 2017-141581 from the Japanese Patent Office.
Communication dated Jun. 19, 2020 from The State Intellectual Property Office of the P R. of China in Application No. 201880002598.4.

(Continued)

*Primary Examiner* — Kevin E Yoon
*Assistant Examiner* — Austin Pollock
(74) *Attorney, Agent, or Firm* — Sughrue Mion, PLLC (57) ABSTRACT

Provided are a sliding member and a sliding bearing which can improve the fatigue resistance. A sliding member having a base layer and a coating layer laminated on the base layer, in which the coating layer contains Bi or Sn as a first metal element, a second metal element which is harder than the first metal element and forms an intermetallic compound with the first metal element, C, and unavoidable impurities.

5 Claims, 4 Drawing Sheets

(56) References Cited

FOREIGN PATENT DOCUMENTS

WO    2009/075314 A1    6/2009

OTHER PUBLICATIONS

Communication dated Oct. 8, 2019 from the Japanese Patent Office in application No. 2017-141581.
Communication dated Jan. 5, 2021, from the Japanese Patent Office in application No. 2017-151239.
Office Action dated Nov. 25, 2020 from the China National Intellectual Property Administration in CN Application No. 201880002598.4.
Communication dated Mar. 9, 2021 from the Japanese Patent Office in Application No. 2020-097535.
Communication dated Mar. 11, 2022 from the Chinese Patent Office in Chinese Application No. 202110053178.2.

\* cited by examiner

SLIDING MEMBER AND SLIDING BEARING

CROSS REFERENCE TO RELATED APPLICATIONS

This application is a National Stage of International Application No. PCT/JP2018/024804 filed Jun. 29, 2018, claiming priority based on Japanese Patent Application No. 2017-141581 filed Jul. 21, 2017 and Japanese Patent Application No. 2017-151239 filed Aug. 4, 2017.

TECHNICAL FIELD

The present invention relates to a sliding member and a sliding bearing in which a counterpart member slides on a sliding surface.

BACKGROUND ART

An overlay layer containing Cu as an essential element and formed of a Bi alloy containing at least one of Sn and In is known (see Patent Literature 1). Patent Literature 1 describes that the fatigue resistance is improved by incorporating Cu and Sn or In in the Bi alloy. Also, a tin-based overlay in which Cu is added to Sn which is a soft metal is known (see Patent Literature 2). In Patent Literature 2 the improvement of wear resistance and fatigue resistance is attempted by adding Cu as a strengthening element to Sn.

CITATIONS LIST

Patent Literature

Patent Literature 1: JP 2004-353042 A
Patent Literature 2: JP 2002-310158 A

SUMMARY OF INVENTION

Technical Problems

However, when Cu is contained in the Bi alloy, as disclosed in Patent Literature 1, there is a problem that the fatigue resistance is rather lowered. This problem arises because, when thermal load is applied to the overlay layer, a hard intermetallic compound is generated by Bi and Cu so that cracks are easily generated at an interface between the hard intermetallic compound and soft Bi. In particular, the coarsening of the intermetallic compound easily develops cracks in the overlay layer, resulting in considerable deterioration in fatigue resistance. Further, when thermal load is applied, for example, at the time of using the tin-based overlay of Patent Literature 2, there is a problem of decrease in fatigue resistance. When thermal load is applied to the tin-based overlay of Patent Literature 2 a hard intermetallic compound is formed by Sn and Cu. Then, an interface is formed between the hard intermetallic compound and soft Sn, across which the hardness is greatly different, and fatigue cracks are easily generated at the interface. Furthermore, fatigue cracks are developed at the interface between the intermetallic compound and Sn, thereby lowering the fatigue resistance.

The present invention has been made in view of the above problems, and it is an object of the present invention to provide a technique capable of realizing the improvement in fatigue resistance of an overlay.

Solutions to Problems

In order to attain the above object, the present invention provides a sliding member and a sliding bearing. The sliding member has a base layer and a coating layer laminated on the base layer, and the coating layer contains Bi as a first metal element, a second metal element which is harder than the first metal element and forms an intermetallic compound with the first metal element, 0.010 wt % or more and 0.080 wt % or less of C, and unavoidable impurities.

In the above structure, even when an intermetallic compound is formed by the first metal element and the second metal element upon application of thermal load, an appropriate amount of C serves as a diffusion barrier, thereby making it possible to reduce the possibility of coarsening of the intermetallic compound. Therefore, the interface between soft Bi and the hard intermetallic compound can be kept small. Therefore, even if fatigue cracks are generated at the interface between soft Bi and the hard intermetallic compound, it is possible to reduce the possibility of considerable development of the fatigue cracks and to improve the fatigue resistance.

Incidentally, by setting the content of C to 0.010 wt % or more, the coarsening of the intermetallic compound can be suppressed. The content of C is more desirably set to 0.020 wt % or more. Further, by setting the content of C to 0.080 wt % or less, the embrittlement of the coating layer can be suppressed. The content of C is more desirably set to 0.060 wt % or less. The second metal element may be any element that is harder than Bi and forms an intermetallic compound with Bi, and examples thereof may include Ag, Sb, and Ni. The content of the second metal element may be 0.5 wt % or more and 5.0 wt % or less, and may be desirably 1.0 wt % or more and 3.0 wt % or less. Bi as the first metal element constitutes the balance except the second metal element, C, and unavoidable impurities.

In order to attain the above object, the present invention provides a sliding member and a sliding bearing. The sliding member has a base layer and a coating layer laminated on the base layer, and the coating layer contains Sn as a first metal element, a second metal element which is harder than the first metal element and forms an intermetallic compound with the first metal element, 0.015 wt % or more and 0.100 wt % or less of C, and unavoidable impurities.

In the above structure, even when an intermetallic compound is formed by the first metal element and the second metal element upon application of thermal load, an appropriate amount of C serves as a diffusion barrier, thereby making it possible to reduce the possibility of coarsening of the intermetallic compound. Therefore, the interface between soft Sn and the hard intermetallic compound can be kept small. Therefore, even if fatigue cracks are generated at the interface between soft Sn and the hard intermetallic compound, it is possible to reduce the possibility of considerable development of the fatigue cracks and to improve the fatigue resistance.

Incidentally, by setting the content of C to 0.015 wt % or more, the coarsening of the intermetallic compound can be suppressed. The content of C is more desirably set to 0.02 wt % or more. Also, by setting the content of C to 0.100 wt % or less, the embrittlement of the coating layer can be suppressed. The content of C is more desirably set to 0.075 wt % or less. The second metal element may be any element that is harder than Sn and forms an intermetallic compound with Sn, and examples thereof may include Ag, Sb, and Ni. The second metal element may be 0.5 wt % or more and 10.0 wt % or less, and may be desirably 1.0 wt % or more and 5.0 wt % or less. Sn as the first metal element constitutes the balance except the second metal, C, and unavoidable impurities.

DETAILED DESCRIPTION OF EMBODIMENTS

Figure 1:
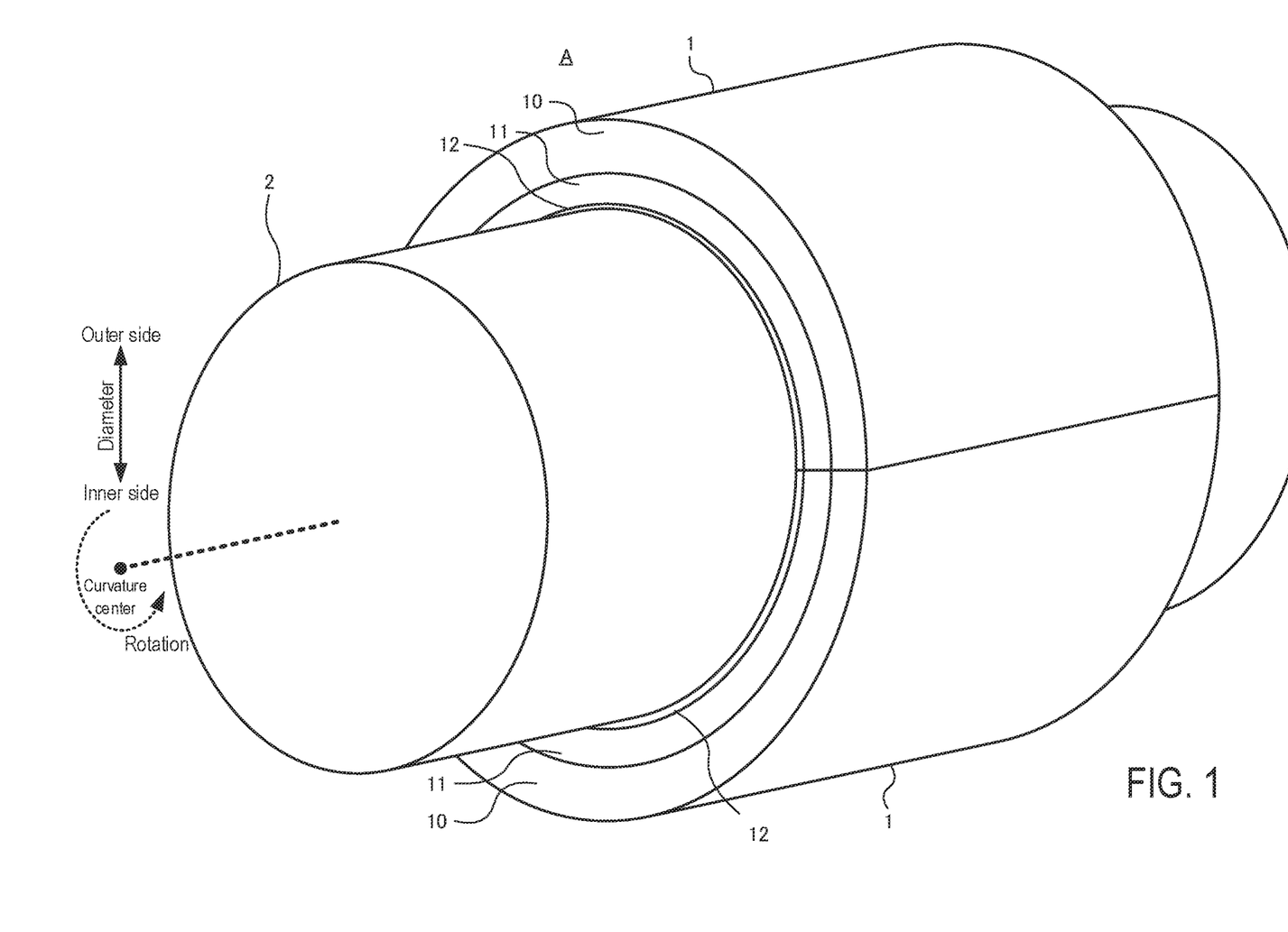
FIG. 1 is a perspective view of a sliding member according to an embodiment of the present invention.

Embodiments of the present invention will be described in the following order.
(1) First embodiment:
(1-1) Structure of sliding member:
(1-2) Measurement method:
(1-3) Method for manufacturing sliding member:
(2) Experimental result:
(3) Second embodiment:
(4) Other Embodiments:

(1) First Embodiment (1-1) Structure of Sliding Member:

FIG. 1 is a perspective view of a sliding member 1 according to the first embodiment of the present invention. The sliding member 1 includes a back metal 10, a lining 11, and an overlay 12. The sliding member 1 is a half-shaped metallic member obtained by dividing a hollow cylinder into two equal parts in a diametrical direction, and has a semicircular arc shape in cross section. By combining the two sliding members 1 so as to form a cylindrical shape, a sliding bearing A is formed. The sliding bearing A bears a columnar counter shaft 2 (crankshaft of an engine) in a hollow portion formed therein. The outer diameter of the counter shaft 2 is formed to be slightly smaller than the inner diameter of the sliding bearing A. A lubricating oil (engine oil) is supplied to a gap formed between the outer peripheral surface of the counter shaft 2 and the inner peripheral surface of the sliding bearing A. At that time, the outer peripheral surface of the counter shaft 2 slides on the inner peripheral surface of the sliding bearing A.

The sliding member 1 has a structure in which the back metal 10, the lining 11, and the overlay 12 are laminated in an order of being distant from the center of curvature. Therefore, the back metal 10 constitutes the outermost layer of the sliding member 1, and the overlay 12 constitutes the innermost layer of the sliding member 1. The back metal 10, the lining 11, and the overlay 12 each have a constant thickness in the circumferential direction. The thickness of the back metal 10 is 1.8 mm, the thickness of the lining 11 is 0.2 mm, and the thickness of the overlay 12 is 10 μm. Twice the radius of the surface on the curvature center side of the overlay 12 (the inner diameter of the sliding member 1) is 73 mm. Hereinafter, the term "inner side" means the curvature center side of the sliding member 1, and the term "outer side" means the side opposite to the center of curvature of the sliding member 1. The inner surface of the overlay 12 constitutes the sliding surface for the counter shaft 2.

The back metal 10 is formed of steel containing 0.15 wt % of C, 0.06 wt % of Mn, and the balance Fe. It suffices that the back metal 10 is formed of a material that can support the load from the counter shaft 2 via the lining 11 and the overlay 12, and the back metal 10 may not necessarily be formed of steel.

The lining 11 is a layer laminated on the inner side of the back metal 10 and constitutes the base layer of the present invention. The lining 11 contains 10 wt % of Sn, 8 wt % of Bi, and the balance consisting of Cu and unavoidable impurities. The unavoidable impurities of the lining 11 are Mg, Ti, B, Pb, Cr, and the like, and are impurities mixed in refining or scrapping. The content of the unavoidable impurities in the lining 11 is 1.0 wt % or less in total. The lining 11 is not limited to that having the above-described composition, and may be formed of an Al alloy in which the total amount of one or more of Bi, Sn, In, and Ni, and unavoidable impurities is 25 wt % or less. Furthermore, the lining 11 may be formed of a Cu alloy. For example, the lining 11 may be formed of a Cu alloy in which the total amount of one or more of Sn, Si, Zn, Mg, Cr, Zr, Ni, and V, and unavoidable impurities is 25 wt % or less.

The overlay 12 is a layer laminated on the inner surface of the lining 11 and constitutes the coating layer of the present invention. In the overlay 12, the coating layer contains Bi as a first metal element, Ni as a second metal element forming an intermetallic compound with the first metal element, C, and unavoidable impurities. In the overlay 12 of the present embodiment, the content of Ni is 2.0 wt %, the content of C is 0.03 wt %, the total content of the unavoidable impurities is 1.0 wt % or less, and the balance is Bi.

A fatigue test piece (connecting rod R) having an overlay 12 similar to that of the above-explained sliding member 1 was prepared, and its fatigue damage area rate was measured. As a result, the fatigue damage area rate was 2.0%, which was good. In a fatigue test which will be described later, even when an intermetallic compound is formed by the first metal element and the second metal element upon application of thermal load, an appropriate amount of C serves as a diffusion barrier, thereby making it possible to reduce the possibility of coarsening of the intermetallic compound. In the present embodiment, $Bi_3Ni$ and the like are precipitated as intermetallic compounds in the overlay 12, but C serves as a diffusion barrier and can suppress coarsening of $Bi_3Ni$ and the like. As a result, the interface between soft Bi and the hard intermetallic compound can be kept small. Therefore, even if fatigue cracks are generated at the interface between soft Bi and the hard intermetallic compound, it is possible to reduce the possibility of considerable development of the fatigue cracks and to improve the fatigue resistance.

Figure 2:
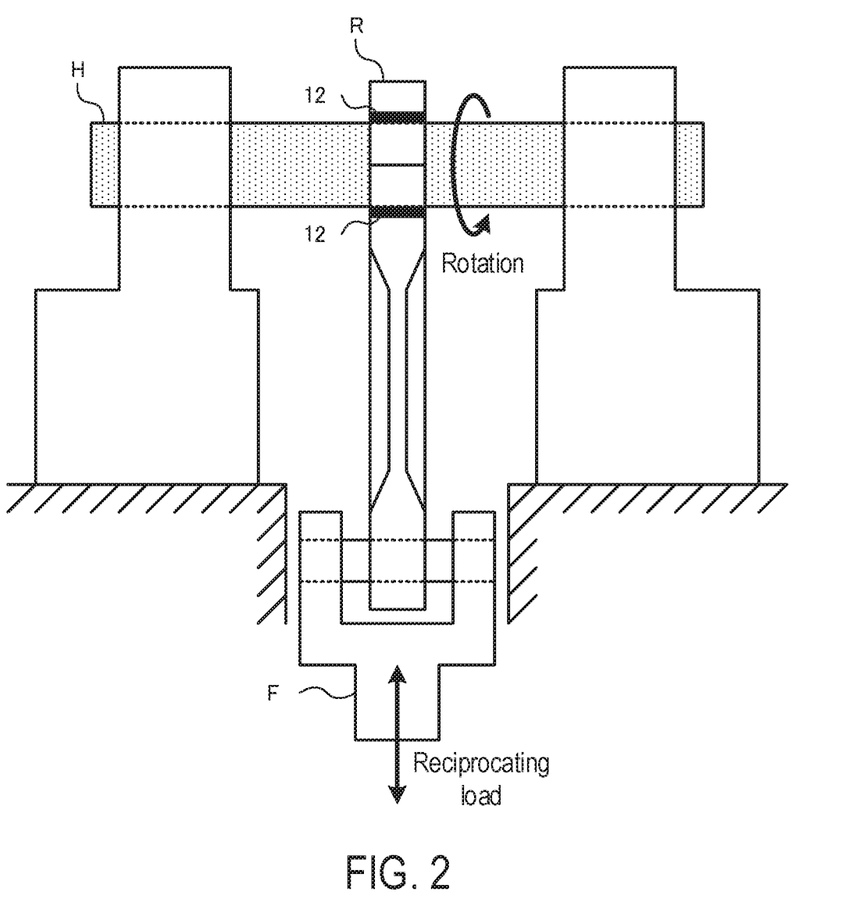
FIG. 2 is an explanatory diagram of a fatigue test.

(1-2) Measurement Method:

The fatigue damage area rate was measured by the following procedure. First, as shown in FIG. 2, a connecting rod R having cylindrical through holes formed at both ends in the longitudinal direction was prepared, and a test shaft H (hatching) was borne in the through hole at one end. An overlay 12 (black) similar to that of the sliding member 1 was formed on the inner peripheral surface of the through hole for bearing the test shaft H formed in the connecting rod R. The test shaft H was borne on both outer sides of the connecting rod R in the axial direction of the test shaft H, and the test shaft H was rotated so that a sliding speed was kept at 6.6 m/sec. The sliding speed is a relative speed between the surface of the overlay 12 and the test shaft H. The end portion of the connecting rod R on the side opposite to the test shaft H was connected to a moving body F reciprocating in the length direction of the connecting rod R, and the reciprocating load of the moving body F was set to 57 MPa. Also, engine oil at 120° C. was fed between the connecting rod R and the test shaft H.

By continuing the above state for 50 hours, the fatigue test of the overlay 12 was carried out. After the fatigue test, the inner surface (sliding surface) of the overlay 12 was photographed from a position on a straight line orthogonal to the surface in such a manner that the straight line served as the main optical axis. So, the taken image was used as an evaluation image. Then, the damaged portion in the surface of the overlay 12 reflected in the evaluation image was observed with a binocular (magnifying glass) and identified. The percentage of a value obtained by dividing the area of the damaged portion, which was the area of the damaged portion, by the area of the entire surface of the overlay 12 reflected in the evaluation image was measured as the fatigue damage area rate.

Each of the numerical values shown in the above embodiment was measured by the following method. The mass of the elements constituting each of the layers of the sliding member 1 was measured by an ICP emission spectroscopic analyzer (ICPS-8100 manufactured by Shimadzu Corporation). However, the concentration of carbon in the overlay 12 was measured by a high-frequency induction heating furnace combustion infrared absorption method (carbon amount analysis method for steel according to JIS G 1211).

The thickness of each of the layers was measured by the following procedures. First, the vertical cross section in the axial direction of the sliding member 1 was polished with a cross section polisher (IB-09010CP manufactured by JEOL Ltd.).

Image data of an observation image (backscattered electron image) was obtained by photographing the cross section of the sliding member 1 with an electron microscope (JSM-6610A manufactured by JEOL Ltd.) at a magnification of 7000 times. Then, the film thickness was measured by analyzing the observation image with an image analyzer (Luzex AP manufactured by NIRECO).

(1-3) Method for Manufacturing Sliding Member:

First, a flat plate of low carbon steel having the same thickness as the back metal 10 was prepared.

Next, powder of a material constituting the lining 11 was scattered on the flat plate formed of low carbon steel. Specifically, Cu powder, Bi powder and Sn powder were scattered on the flat plate of low carbon steel so as to attain the mass ratio among the respective components in the lining 11 described above. It suffices that the mass ratio among the respective components in the lining 11 can be satisfied, and alloy powder such as Cu—Bi or Cu—Sn may be scattered on the flat plate of low carbon steel. The particle sizes of the powders were adjusted to 150 μm or less by a test sieve (JIS Z 8801).

Next, the flat plate of low carbon steel and the powders sprayed on the flat plate were sintered. The sintering temperature was controlled to 700 to 1000° C., and the sintering was performed in an inert atmosphere. After the sintering, the sintered flat plate was cooled. The lining 11 may not necessarily be formed by sintering, and may be formed by casting or the like.

After completion of the cooling, a Cu alloy layer is formed on the flat plate of low carbon steel. The Cu alloy layer contains soft Bi particles precipitated during the cooling.

Next, the low carbon steel having a Cu alloy layer formed thereon was pressed so as to have a shape obtained by dividing a hollow cylinder into two equal parts in diameter. At this time, the pressing process was performed so that the outer diameter of the low carbon steel matched with the outer diameter of the sliding member 1.

Next, the surface of the Cu alloy layer formed on the back metal 10 was cut. At this time, the cutting amount was controlled so that the thickness of the Cu alloy layer formed on the back metal 10 was the same as that of the lining 11. Thereby, the lining 11 can be formed by the Cu alloy layer after the cutting process. The cutting process was carried out by a lathe with a cutting tool material made, for example, of sintered diamond set. The surface of the lining 11 after the cutting process constitutes the interface between the lining 11 and the overlay 12.

Next, Bi was laminated by a thickness of 10 μm on the surface of the lining 11 by electroplating, whereby the overlay 12 was formed. The electroplating procedures were as follows. First, the surface of the lining 11 was washed with water. Further, unnecessary oxides were removed from the surface of the lining 11 by pickling the surface of the lining 11. Thereafter, the surface of the lining 11 was again washed with water.

Upon completion of the above pretreatment, electroplating was performed by supplying a current to the lining 11 immersed in a plating bath. The bath composition of the plating bath contained organic Bi sulfonate: 20 g/l (Bi concentration), Ni nitrate: 1 g/l (Ni concentration), organic surfactant: 20 ml/l, and organic sulfonic acid: 100 g/l. As the organic surfactant, a polyethylene glycol solution was used. The bath temperature of the plating bath was set to 30° C. Further, the current to be supplied to the lining 11 was a direct current, and the current density was set to 3.0 A/dm$^2$. After completion of the electroplating, water washing and drying were carried out.

When the sliding member 1 was completed as described above, the sliding bearing A was formed by combining the two sliding members 1 in a cylindrical shape, and attached to the engine.

(2) Experimental Result

Example 1 in which the concentration of the organic surfactant was changed to 5 ml/l, Example 2 in which the concentration of the organic surfactant was changed to 10 ml/l, Example 3 (first embodiment) in which the concentration of the organic surfactant was 20 ml/l, Example 4 in which the concentration of the organic surfactant was changed to 40 ml/l, and Comparative Example 1 in which the concentration of the organic surfactant was changed to 80 ml/l, in the same electroplating as that of the first embodiment, were prepared. Further, Comparative Example 2 in which electroplating was performed in a plating bath of sulfuric acid bath (Bi nitrate: 30 g/l (Bi concentration), Ni nitrate: 2 g/l (Ni concentration), sulfuric acid: 100 g/l) was prepared.

TABLE 1

| | Organic surfactant [ml/l] | Carbon concentration [wt %] | Fatigue damage area rate [%] |
|---|---|---|---|
| Example 1 | 20 | 0.01 | 8 |
| Example 2 | 10 | 0.015 | 6 |
| Example 3 (First embodiment) | 20 | 0.03 | 2 |

TABLE 1-continued

|  | Organic surfactant [ml/l] | Carbon concentration [wt %] | Fatigue damage area rate [%] |
|---|---|---|---|
| Example 4 | 40 | 0.08 | 6 |
| Comparative Example 1 | 80 | 0.18 | 25 |
| Comparative Example 2 | 0 (Sulfuric acid bath) | 0.005 | 18 |

Table 1 shows the carbon concentration and the fatigue damage area rate in the overlay 12 in Examples 1 to 4 and Comparative Examples 1 and 2, respectively. The carbon concentration and the fatigue damage area rate were measured by the same methods as those in the first embodiment. As indicated in Table 1, it was possible to increase the concentration of carbon in the overlay 12 by increasing the concentration of the organic surfactant in the plating bath. Further, as in Comparative Example 2, by using a plating bath containing no organic substance, the concentration of carbon in the overlay 12 could be made almost zero.

Figure 3:
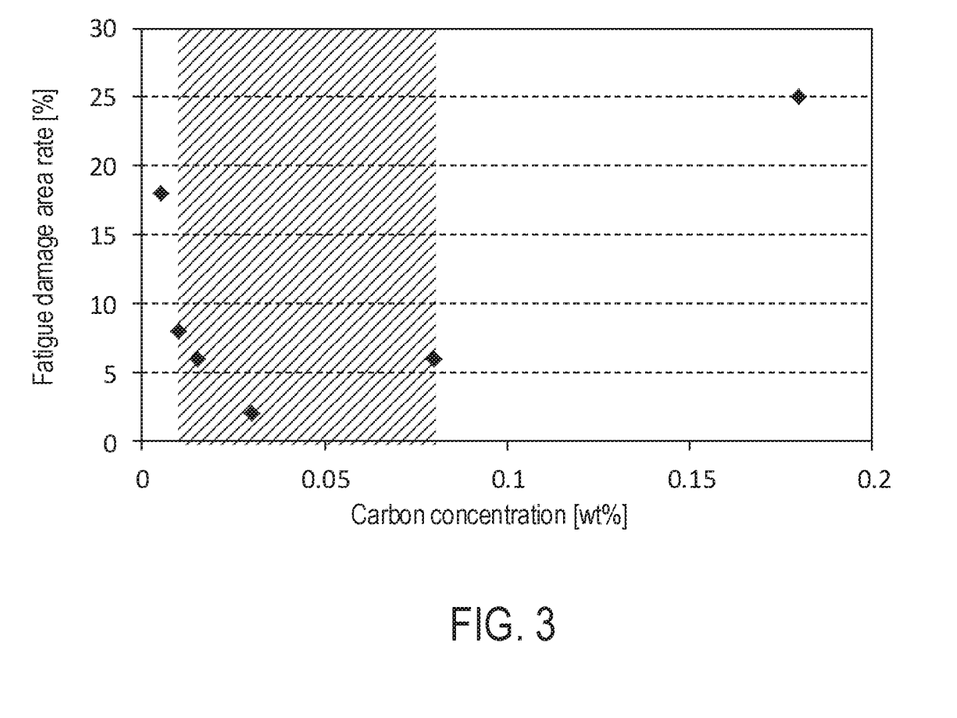
FIG. 3 is a graph of the carbon concentration and the fatigue damage area rate in an overlay of a first embodiment.

FIG. 3 is a graph showing the relationship between the carbon concentration and the fatigue damage area rate. As shown in the figure, it was found that better fatigue resistance was exhibited as the carbon concentration was higher in the carbon concentration range of 0.03 wt % or less. It is considered that the coarsening of $Cu_6Bi_5$ and $Cu_3Bi$ could be suppressed effectively as the carbon concentration was increased. It was found that better fatigue resistance was exhibited as the carbon concentration was lower in the carbon concentration range of more than 0.03 wt %. It is considered that the embrittlement of the overlay 12 due to C could be suppressed more as the carbon concentration was lower.

In addition, as shown by hatching in the graph of FIG. 3, it was found to be desirable to set the content of C to 0.010 wt % or more and 0.080 wt % or less. More desirably, the C content is 0.02 wt % or more and 0.060 wt % or less.

(3) Second Embodiment

The second embodiment is identical with the first embodiment in terms of the structure other than the overlay 12. Hereinafter, the overlay 12 of the second embodiment will be described. The overlay 12 of the second embodiment is also a layer laminated on the inner surface of the lining 11 and constitutes the coating layer of the present invention. In the overlay 12 of the second embodiment, the coating layer contains Sn as a first metal element, Cu as a second metal element forming an intermetallic compound with the first metal element, C, and unavoidable impurities. In the overlay 12 of the second embodiment, the content of Cu is 3.0 wt %, the content of C is 0.05 wt %, the total content of the unavoidable impurities is 1.0 wt % or less, and the balance is Sn.

A fatigue test piece (connecting rod R) having the above-explained overlay 12 of the second embodiment was prepared, and its fatigue damage area rate was measured. As a result, the fatigue damage area rate was 3.0%, which was good. In a fatigue test, even when an intermetallic compound is formed by the first metal element and the second metal element upon application of thermal load, an appropriate amount of C serves as a diffusion barrier, thereby making it possible to reduce the possibility of coarsening of the intermetallic compound. In the second embodiment, $Cu_6Sn_5$ and $Cu_3Sn$ are precipitated as intermetallic compounds in the overlay 12, but C serves as a diffusion barrier and can suppress the coarsening of $Cu_6Sn_5$ and $Cu_3Sn$. As a result, the interface between soft Sn and the hard intermetallic compound can be kept small. Therefore, even if fatigue cracks are generated at the interface between soft Sn and the hard intermetallic compound, it is possible to reduce the possibility of considerable development of the fatigue cracks and to improve the fatigue resistance.

Next, Sn was laminated by a thickness of 10 μm on the surface of the lining 11 by electroplating, whereby the overlay 12 of the second embodiment was formed. The electroplating procedures were as follows. First, the surface of the lining 11 was washed with water. Further, unnecessary oxides were removed from the surface of the lining 11 by pickling the surface of the lining 11. Thereafter, the surface of the lining 11 was again washed with water.

Upon completion of the above pretreatment, electroplating was performed by supplying a current to the lining 11 immersed in a plating bath. The bath composition of the plating bath contained stannous nitrate: 28 g/l (Sn concentration), copper sulfate: 3 g/l (Cu concentration), inorganic ammonium salt: 100 g/l, and organic carboxylic acid: 80 g/l. The bath temperature of the plating bath was set to 30° C. Further, the current to be supplied to the lining 11 was a direct current, and the current density was set to 2.0 A/dm². After completion of the electroplating, water washing and drying were carried out.

Example 5 in which the concentration of the organic carboxylic acid was changed to 20 g/l, Example 6 in which the concentration of the organic carboxylic acid was changed to 40 g/l, Example 7 (second embodiment) in which the concentration of the organic carboxylic acid was changed to 80 g/l, Example 8 in which the concentration of the organic carboxylic acid was changed to 100 g/l, and Comparative Example 3 in which the concentration of the organic carboxylic acid was changed to 200 g/l, in the same electroplating as that of the second embodiment, were prepared. Further, Comparative Example 4 in which electroplating was performed in a plating bath of borofluoride bath (tin borofluoride, copper borofluoride) was prepared.

TABLE 2

|  | Organic carboxylic acid [ml/l] | Carbon concentration [wt %] | Fatigue damage area rate [%] |
|---|---|---|---|
| Example 5 | 20 | 0.015 | 8 |
| Example 6 | 40 | 0.02 | 5 |
| Example 7 (Second embodiment) | 80 | 0.05 | 3 |
| Example 8 | 100 | 0.1 | 7 |
| Comparative Example 3 | 200 | 0.5 | 21 |
| Comparative Example 4 | 0 (Borofluoride bath) | 0.005 | 15 |

Table 2 shows the carbon concentration and the fatigue damage area rate in the overlay 12 in Examples 5 to 7 and Comparative Examples 3 and 4, respectively. The carbon concentration and the fatigue damage area rate were measured by the same methods as those in the first embodiment. As indicated in Table 2, it was possible to increase the concentration of carbon in the overlay 12 by increasing the concentration of the organic carboxylic acid in the plating bath. Further, as in Comparative Example 4, by using a plating bath containing no organic substance, the concentration of carbon in the overlay 12 could be made almost zero.

Figure 4:
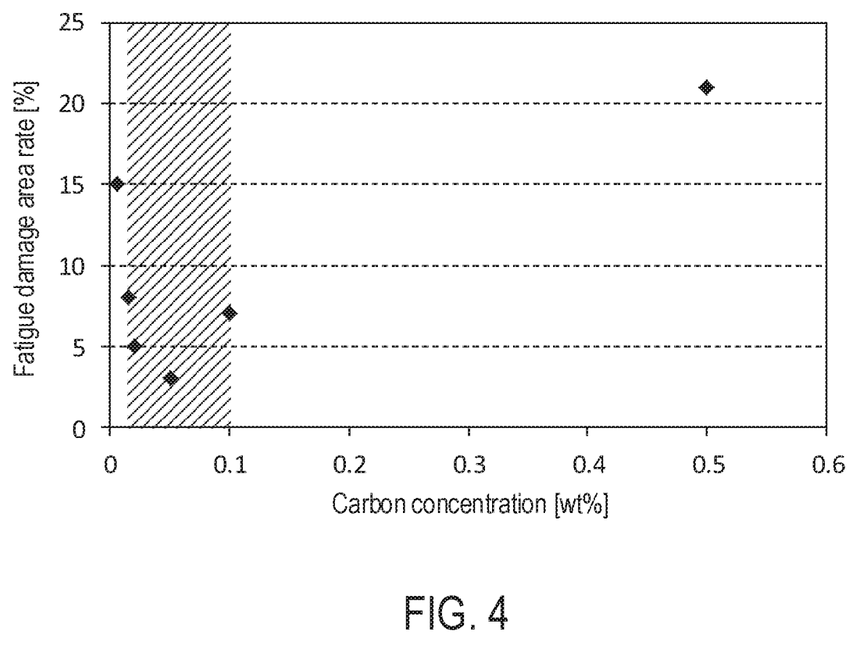
FIG. 4 is a graph of the carbon concentration and the fatigue damage area rate in an overlay of a second embodiment.

FIG. 4 is a graph showing the relationship between the carbon concentration and the fatigue damage area rate in the second embodiment. As shown in the figure, it was found that better fatigue resistance was exhibited as the carbon concentration was higher in the carbon concentration range of 0.05 wt % or less. It is considered that the coarsening of $Cu_6Sn_5$ and $Cu_3Sn$ could be suppressed effectively as the carbon concentration was increased. It was found that better fatigue resistance was exhibited as the carbon concentration was lower in the carbon concentration range of more than 0.05 wt %. It is considered that the embrittlement of the overlay 12 due to C could be suppressed more as the carbon concentration was lower.

In addition, as shown by hatching in the graph of FIG. 4, it was found to be desirable to set the content of C to 0.015 wt % or more and 0.100 wt % or less. Further, it is more desirable to set the C content to 0.02 wt % or more and 0.075 wt % or less.

(4) Other Embodiments

In the above embodiment, Cu was employed as the second metal element, but other elements (Ag, Sb, Ni, Au, and the like) harder than Bi (for example, having higher Mohs hardness) may be adopted as the second metal element. In addition, the formation of the intermetallic compound is not necessarily limited to that during use of the sliding member 1. For example, before use of the sliding member 1, the precipitation of the intermetallic compound may be completed by preliminary heat treatment. Also in this case, the coarsening of the intermetallic compound can be suppressed by an appropriate amount of C.

Further, an intermediate layer may be inserted between the lining 11 and the overlay 12. The intermediate layer is desirably formed of a material capable of suppressing diffusion of the elements of the lining 11 into the overlay 12, and may be formed of Cu, for example. The carbon concentration of the overlay 12 may not necessarily be adjusted by the carbon concentration in the plating bath of electroplating, and the method for forming the overlay 12 is not limited to the electroplating. For example, the overlay 12 may be formed by sputtering or vapor deposition, and the carbon concentration may be adjusted during sputtering or vapor deposition. Further, after formation of the overlay 12 having a low carbon concentration, the carbon concentration may be increased by diffusion or the like.

In the above embodiment, the sliding members 1 constituting the sliding bearing A for bearing the crankshaft of an engine have been illustrated, but a sliding bearing A for another purpose may be formed by the sliding members 1 of the present invention. For example, a radial bearing such as a transmission gear bush or a piston pin bush/boss bush may be formed by the sliding member 1 of the present invention. Furthermore, the sliding member of the present invention may be used in thrust bearings, various washers, or swash plates for car air-conditioner compressors. Further, the matrix of the lining 11 is not limited to the Cu alloy, and it suffices that the material of the matrix is selected according to the hardness of the counter shaft 2. Also, the back metal 10 is not essential and may not be used.

REFERENCE SIGNS LIST

1 Sliding member
2 Counter shaft
10 Back metal
11 Lining
12 Overlay
A Bearing
F Moving body
H Test shaft
R Connecting rod

The invention claimed is:
1. A sliding member, comprising:
a base layer, and
a coating layer laminated on the base layer,
wherein the coating layer consists of:
  Bi as a first metal element;
  0.5 wt % or more and 5.0 wt % or less of Ni as a second metal element, the second metal element being harder than the first metal element and being capable of forming an intermetallic compound with the first metal element;
  0.010 wt % or more and 0.080 wt % or less of C; and
  unavoidable impurities.
2. The sliding member of claim 1, wherein the sliding member is a sliding bearing.
3. The sliding member of claim 1, wherein the content of Ni is 1.0 wt % or more and 3.0% or less.
4. The sliding member of claim 1, wherein the content of C is 0.020 wt % or more and 0.060 wt % or less.
5. The sliding member of claim 4, wherein the content of Ni is 1.0 wt % or more and 3.0% or less.

* * * * *